(12) United States Patent
Doornkamp

(10) Patent No.: US 7,173,679 B2
(45) Date of Patent: Feb. 6, 2007

(54) TRANSFLECTIVE LIQUID CRYSTAL DISPLAY DEVICE

(75) Inventor: Ciska Doornkamp, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 180 days.

(21) Appl. No.: 10/523,621

(22) PCT Filed: Jul. 22, 2003

(86) PCT No.: PCT/IB03/03178

§ 371 (c)(1),
(2), (4) Date: Feb. 1, 2005

(87) PCT Pub. No.: WO2004/015486

PCT Pub. Date: Feb. 19, 2004

(65) Prior Publication Data

US 2006/0001804 A1    Jan. 5, 2006

(30) Foreign Application Priority Data

Aug. 2, 2002  (EP) ................... 02078172

(51) Int. Cl.
G02F 1/1335  (2006.01)
(52) U.S. Cl. ...................... 349/114; 349/115
(58) Field of Classification Search ........ 349/114–115
See application file for complete search history.

(56) References Cited

U.S. PATENT DOCUMENTS

| | | | | |
|---|---|---|---|---|
| 5,841,494 A | * | 11/1998 | Hall | 349/98 |
| 6,621,543 B2 | * | 9/2003 | Moon | 349/115 |
| 2001/0020990 A1 | * | 9/2001 | Moon | 349/96 |
| 2001/0055083 A1 | * | 12/2001 | Jiang et al. | 349/115 |
| 2002/0135719 A1 | * | 9/2002 | Moon et al. | 349/115 |
| 2003/0128319 A1 | * | 7/2003 | Maeda | 349/115 |

FOREIGN PATENT DOCUMENTS

| | | | |
|---|---|---|---|
| EP | 1217421 A2 | * | 6/2002 |
| JP | 2000131684 A | * | 5/2000 |

* cited by examiner

Primary Examiner—James A. Dudek

(57) ABSTRACT

This invention relates to a transflective liquid crystal display device, having a plurality of pixels (1), each comprising a liquid crystal layer (2) being sandwiched between a front and a back substrate (4, 5), a back light (10), a semi-transparent reflective element (7), being arranged between the back substrate (5) and the back light (5), a front polarizer (6), and a driving arrangement (3) for controlling optical properties of the liquid crystal layer (2), whereby the pixel is subdivided into a reflective pixel part (1*a*) and a transmissive pixel part (1*b*). According to the invention, a cholesteric layer composition (11, 12) is arranged between said liquid crystal layer (2) and the back substrate (5), said cholesteric layer composition comprising; in said reflective pixel part (1*a*), a first cholesteric layer composition part (11) for reflecting a desired primary pixel color, and in said transmissive pixel part (1*b*) a second cholesteric layer composition part (12) for reflecting the remaining primary colors, other than said desired primary pixel color.

10 Claims, 7 Drawing Sheets

TRANSFLECTIVE LIQUID CRYSTAL DISPLAY DEVICE

This invention relates to a transflective liquid crystal display device, having a plurality of pixels, each comprising a liquid crystal layer being sandwiched between a front and a back substrate, a back light, a semi-transparent reflective element, being arranged between the back substrate and the back light, a front polariser, and a driving arrangement for controlling optical properties of the liquid crystal layer, whereby the pixel is subdivided into a reflective pixel part and a transmissive pixel part.

Due to its low power consumption, reliability and low price, liquid crystal displays, or LCDs, have become the standard display choice for many applications, for example mobile applications, such as PDAs, laptops and cellular telephones. Different LCD types, such as passive or active matrix displays and reflective or transmissive displays are currently available on the market. Reflective LCDs are especially suited for outdoor use in direct sunlight. However, the contrast ratio of such a display is relatively low, compared with a transmissive display, and under poor illumination conditions, the brightness of this kind of display is low. On the other hand, transmissive LCDs have a good contrast ratio, but they become practically unreadable under direct sunlight illumination conditions. Furthermore, the transmissive display utilizes a backlight, resulting in an increase of the power consumption.

For this reason, transflective displays, having both transmissive and reflective properties have been developed. Initially, most such displays comprises a transflective semi-transparent mirror member in the back of the pixel, the entire pixel thereby constituting a transflective unit. However, recently transflective displays have been developed, wherein each pixel comprises a reflective pixel part and a transmissive pixel part, hence achieving transflective operation. One example of such a display is disclosed in the article "Development of advanced TFT with good legibility under any intensity of ambient light; Masumi Kubo et. Al; Sharp Corp, IDW '99". This article discloses a display in which each pixel comprises a reflective structure and a transmissive structure. However, this structure is rather complex, and in order to manufacture such a display cell, a plurality of mask steps is needed, and hence this display is quite expensive to manufacture. Moreover, this structure requires more retardation films than ordinary reflective LCD displays, and may therefore be costly to produce.

Hence, an object of the present invention is to achieve a transflective liquid crystal display device having an alternative configuration, overcoming at least some of the drawbacks with the prior art.

The above and other objects are achieved by a transflective liquid crystal device as described by way of introduction, being characterised in that a first cholesteric layer composition is arranged between said liquid crystal layer and the back substrate, said cholesteric layer composition comprising, in said reflective pixel part, a first cholesteric layer composition part for reflecting a desired primary pixel colour, and in said transmissive pixel part, a second cholesteric layer composition part for reflecting the remaining primary colours, other than said desired primary pixel colour. By using cholesteric colour filters in this way in a transflective display, single gap configuration may be used. Furthermore, only one retardation film is necessary in the stack. Also the solution is independent of the configuration of the driving means and hence there is no reverse images in the transmissive and reflective mode. Furthermore, this configuration ensures an optimal efficiency of light, both in the transmissive and reflective mode. Moreover, this solution enables light recycling in the transmissive mode, which further increases the efficiency of the backlight.

Suitably, the second cholesteric layer composition part comprises a first and a second layer, wherein the first layer is arranged to reflect light of a first remaining primary colour, and the second layer is arranged to reflect light of a second remaining primary colour. Such a structure has the advantage that it is comparatively easy to manufacture. It may be manufactured by applying two cholesteric manufacturing layers all over the display structure, i.e. in both the reflective and the transmissive parts of the pixels, and patterning each layer individually. First, a first layer is applied to the structure, which layer is patterned by means of colour formation through a photo mask, so that the layer is patterned to reflect the desired primary pixel colour in the reflective part of the pixel, and a first remaining primary colour in the transmissive part. Subsequently, a second cholesteric manufacturing layer is applied on the first layer, which layer is patterned by means of colour formation through a photo mask, so that the layer is pattern to reflect the desired primary pixel colour in the reflective part of the pixel, and a second remaining primary colour in the transmissive part. Together, the above constitute said cholesteric layer composition. Hence, a structure is achieved in which the reflective part comprises a composite cholesteric layer structure, reflecting a desired primary colour, such as "Green", (due to the manufacturing, the reflective part in this case comprises two layers, both reflecting "Green") while the transmissive part comprises a layered structure, in which each layer reflects a certain remaining primary colour, such as "Blue" and "Red", respectively. This is a comparatively easy way of achieving a reflective layer, for reflecting several wavelength intervals.

In accordance with a preferred embodiment of this invention, the pixel further comprises an absorbing colour filter between said liquid crystal layer and said cholesteric colour filter composition, said absorbing colour filter being arranged to absorb the undesired colours of in-falling ambient light. By including such a layer, reflection of ambient light, having undesired colour, on the cholesteric layer composition may be prevented, in both a "white" and a "black" state of the display.

In accordance with a second preferred embodiment of this invention, said pixel further comprises an in-cell quarter-wave retarder plate and an in-cell polariser, both being arranged between the liquid crystal layer and the cholesteric layer composition. This improves the black state of the reflective and transmissive mode. Also, the above two described preferred embodiments may be combined, thereby achieving all of the advantages mentioned above.

Moreover, an absorbing layer is arranged in the reflective pixel part, between the first cholesteric layer composition part and the back substrate. Thereby, all incoming light, that has not already been reflected by the cholesteric layer in the reflective part, will be absorbed. Moreover, light generated by the backlight will be absorbed before entering the cholesteric layer of the reflective part of the display, and will hence not degrade the colour purity of the pixel part. The inclusion of such an absorbing layer will hence not be needed if the display device comprises the quarterwave retarder, the polariser as well as the absorbing colour filter, as described above, since in this case all unwanted light will already have been absorbed, either by the absorbing colour filter or the polariser. Preferably, a mirror element is arranged between the absorbing layer and the back substrate.

Thereby, light generated by the backlight will be reflected back to the backlight, and hence be recycled, improving the efficiency of the backlight.

Suitably, said liquid crystal layer is arranged to act as a λ/2 plate changing the handed-ness of circular polarised light. The liquid crystal layer may be of any conventional type. In particular, twisted nematic (TN), supertwisted nematic (STN), ferro-electric (FLC), electrically compensated birefringence (ECB) and vertically aligned nematic (VAN) liquid crystal configurations may be used.

Moreover, a reflective layer is suitably arranged on a back side of said back substrate, said reflective layer being a reflective circular polariser. Also, said driving arrangement is one of an active matrix driving arrangement or a passive matrix driving arrangement, and hence the inventive solution is very flexible.

Finally, said first and second cholesteric layer composition parts occupy essentially the same cell gap, which enables easy manufacturing by means of photo mask formation as indicated above.

Presently preferred embodiments of this invention will hereinafter be described with reference to the accompanying drawings, on which:

A main embodiment of this invention, as well as the most simple implementation of this invention, will hereinafter be closer described with reference to FIG. 1–4. The display device will hereinafter be described with reference to a single pixel of the display device, in the present case a green pixel. However, the display device may however comprise a plurality of pixels, for example a plurality of green, red and blue pixels, in order to generate a fall colour display. The invention is equally applicable to pixels of any colour, and for a red and a blue pixel, for example, the colours of the cholesteric colour filter, and any colour filter are changed in such a way, in relation to the below description, that the pixel is red or blue, respectively, in the reflective mode as well as the transmissive mode, instead of green as in the present case. Also, the choice of primary colours red, green and blue is not essential for the invention, but any colour combination together defining a full colour spectrum may be used.

Figure 1:
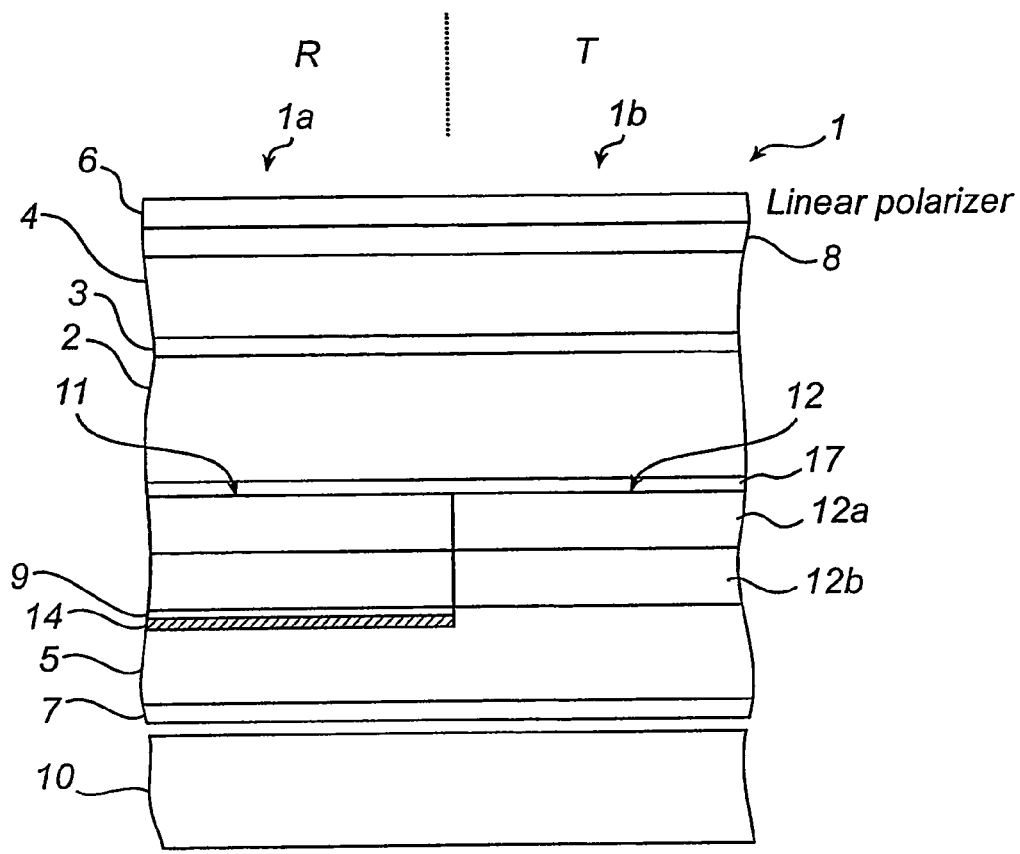
FIG. 1 illustrates a cross section of a pixel of a display device in accordance with this invention, the illustrated pixel being a green pixel of an RGB transflective active matrix liquid crystal display device.

A cross section of a design for a single pixel 1 of a transflective liquid crystal device (LCD) with a cholesteric colour filter in accordance with the invention is disclosed in FIG. 1. The pixel 1 essentially comprises a liquid crystal (LC) layer 2, being controlled by means of a TFT layer 3. Behind the LC layer 2, as seen from a viewer of the display, a cholesteric layer composition 11, 12 is arranged. This layer will be closer described below. The stack comprising the LC layer 2 and the cholesteric layer composition 11, 12 is sandwiched between a front and a back substrate 4, 5. Behind the back substrate, a reflecting circular polariser 7 is arranged. In front of the front substrate 4, a linear polariser 6 and a λ/4 retarder 8 is arranged, the retarder 8 being arranged behind the polariser 6 and the front substrate 4. Behind the stack comprising all of the above components, a backlight 9 is arranged. The pixel 1 is further subdivided into two parts, a reflective pixel part 1a and a transmissive pixel part 1b, The subdivision is made by means of altering the cholesteric layer composition in the reflective and transmissive parts of the display.

In the reflective part 1a of the pixel, the layer composition comprises a first cholesteric layer composition part 11, in the present case being arranged to reflect light of the colour green, i.e. the desired primary colour of the pixel. Between the first cholesteric layer composition part 11 and the back substrate an absorbing layer 9, such as a black layer is arranged. Furthermore, in the reflective part of the display, a mirror element 14 may be positioned between the absorbing layer 9 and the back substrate 5, in order to enhance light recycling in the back-light by avoiding absorption of light emanating from the backlight by said absorbing layer 9.

In the transmissive part of the pixel, the cholesteric layer composition comprises a second cholesteric layer composition part 12, being subdivided into two sub-layers, one for reflecting blue light and one for reflecting red light, i.e. the remaining primary colours of the pixel (other than the desired pixel colour green). Both sub-layers extend in parallel over virtually the entire transmissive pixel part. With known techniques, it is relatively easy to manufacture a cholesteric colour filter, being sub-divided into several parts as in the present invention. It may be manufactured by applying two cholesteric manufacturing layers all over the display structure, i.e. in both the reflective and the transmissive parts of the pixels, and patterning each layer individually. First, a first layer is applied to the structure, which layer is patterned by means of colour formation through a photo mask, so that the layer is pattern to reflect the desired primary pixel colour in the reflective part of the pixel, and a first remaining primary colour in the transmissive part. Subsequently, a second cholesteric manufacturing layer is applied on the first layer, which layer is patterned by means of colour formation through a photo mask, so that the layer is patterned to reflect the desired primary pixel colour in the reflective part of the pixel, and a second remaining primary colour in the transmissive part. Together, the above constitute said cholesteric layer composition. Hence, a structure is achieved in which the reflective part comprises a composite cholesteric layer structure, reflecting a desired primary colour, such as "Green", (due to the manufacturing, the reflective part in this case comprises two layers, both reflecting "Green") while the transmissive part comprises a layered structure, in which each layer reflects a certain remaining primary colour, such as "Blue" and "Red", respectively.

Figure 2:
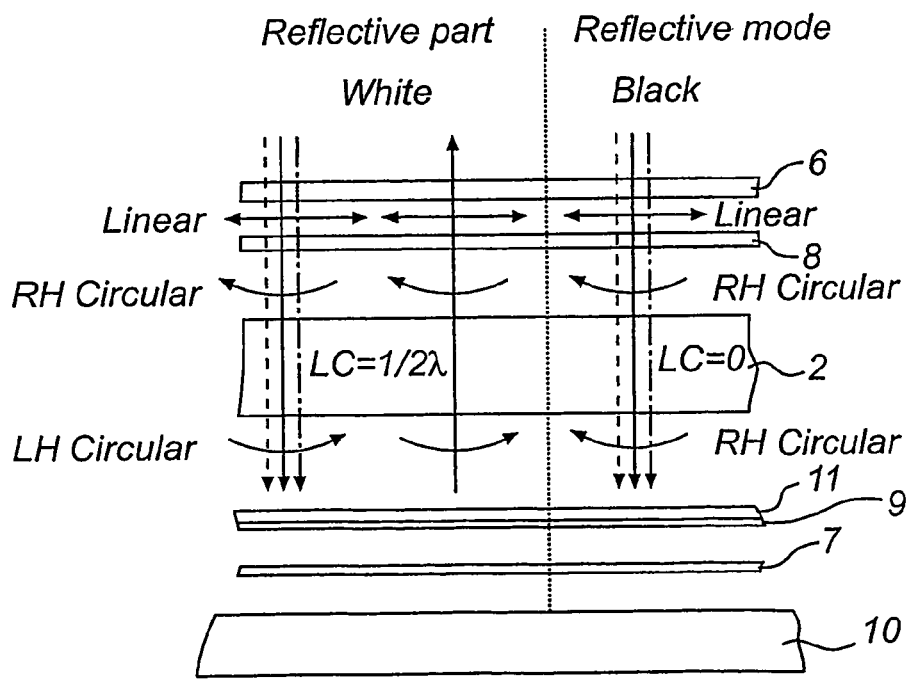
FIG. 2 illustrates the path of polarised light for a white and a black state of the reflective part of the pixel shown in FIG. 1, in a reflective mode.
Figure 3:
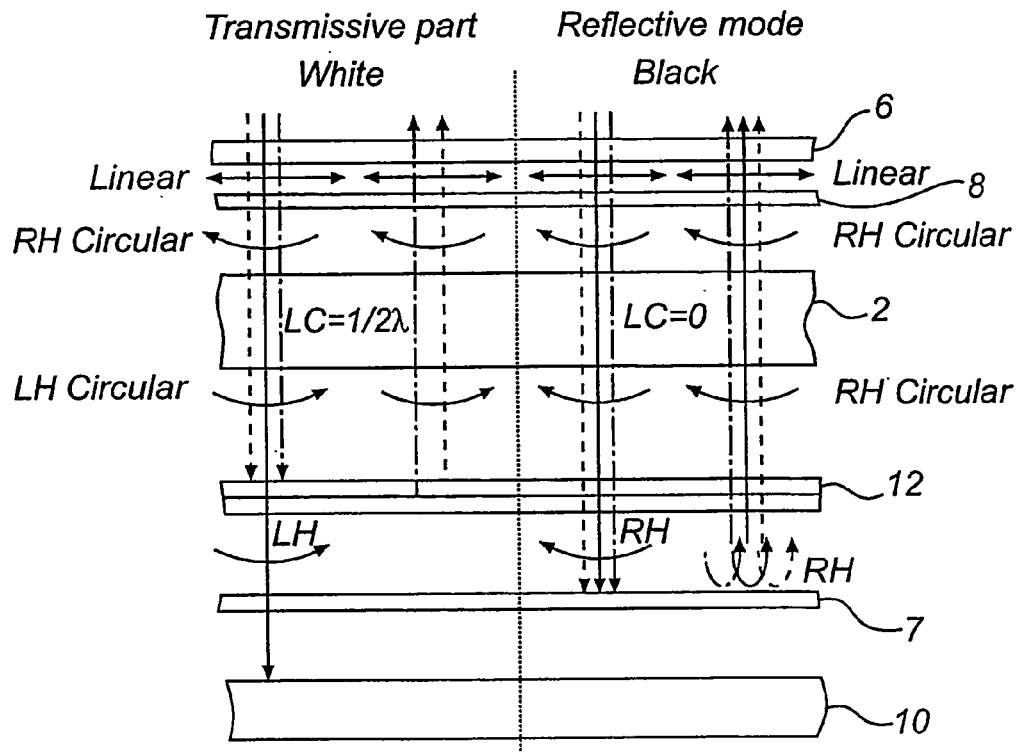
FIG. 3 illustrates the path of polarised light for a white and a black state of the transmissive part of the pixel shown in FIG. 1, in a reflective mode.
Figure 4:
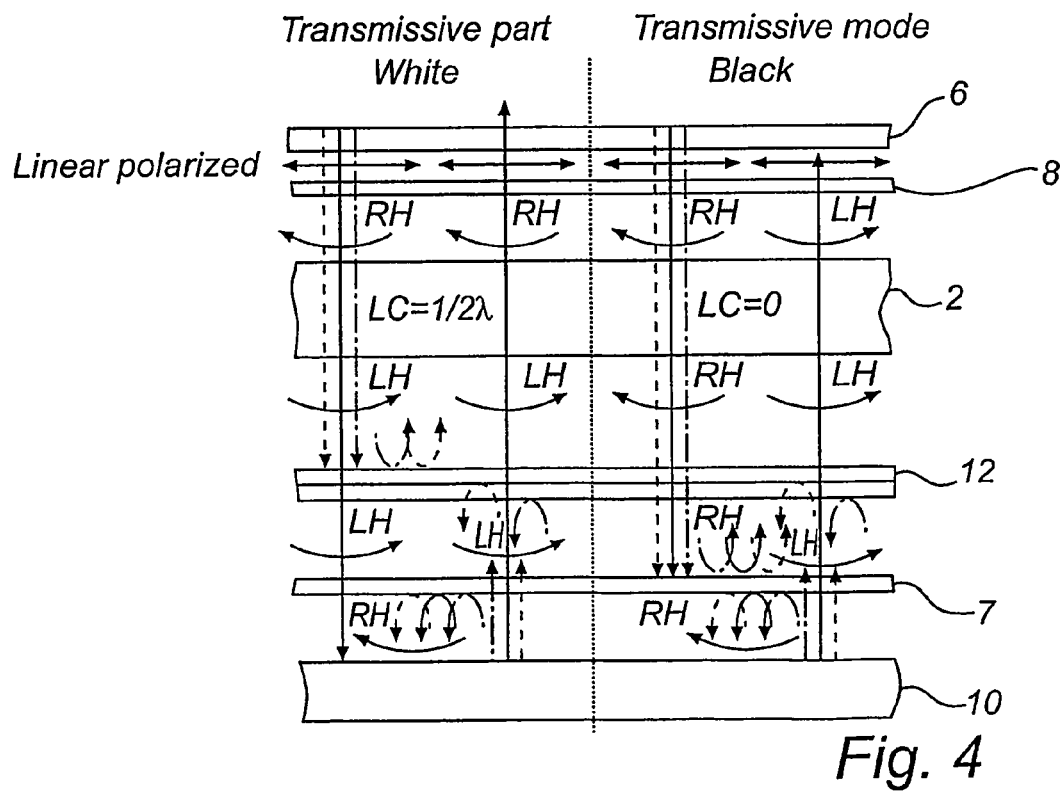
FIG. 4 illustrates the path of polarised light for a white and a black state of the transmissive part of the pixel shown in FIG. 1, in a transmissive mode.

The principle of operation of the above display device will hereinafter be closer described with reference to FIG. 2–4.

The reflective pixel part 1a of the transflective pixel has the normal configuration for a reflective LCD with a cholesteric colour filter. The path of the polarized light entering the display pixel 1 is shown in FIG. 2, both when the pixel part is in a "white" state (i.e. reflecting the colour green) as seen to the left in FIG. 2, and when the pixel part is in a "black" state, as seen to the right in FIG. 2. The first cholesteric layer composition part 11 is in this case arranged to reflect green left-handed polarized light. The linear polariser 6 and the λ/4 plate 8 are combined in such a way that right handed circular polarized light is generated. The liquid crystal layer 2, which is arranged to act as a λ/2 plate in one switching position (as shown to the left in FIG. 2), changes the right-handed circular polarised light into left-handed polarized light. Subsequently, the light reaches the cholesteric colour filter, and left-handed green light is reflected, while the remaining light is transmitted through the first cholesteric layer composition part 11 and absorbed by the absorbing layer 9. The reflected green left-handed polarized light is again changed to right-handed polarized light when passing the liquid crystal layer 2, and is subsequently transmitted through the λ/4 plate 8 and the linear polariser 6. If the liquid crystal layer 2 is switched by means of the control layer 3 (the TFT layer), the retardation of the LC layer 2 is switched to zero (right part of FIG. 2), the right-handed polarized light falling onto the layer is not changed. Hence, the right-handed polarized light is transmitted through the cholesteric layer 11 and is absorbed by the absorption layer 9. In this way, the pixel becomes "black".

The transmissive pixel part 1b of the pixel has the configuration for a transmissive LCD with cholesteric colour filters. The reflective circular polarizer 7 is in this case a right-handed reflective circular polariser and reflects right-handed circular polarized light from the backlight and transmits left-handed circular polarized light. The reflected right-handed polarised light may be recycled in the backlight. The red and blue reflecting cholesteric sub-layers 12a, 12b respectively reflects the red and the blue left-handed polarised daylight and the green left-handed polarised daylight is transmitted through the second cholesteric layer composition part 12 (see the left part of FIG. 4). The green left-handed polarized daylight may be recycled in the backlight, while the reflected blue and red left-handed polarized daylight reduces the colour purity of the pixel.

In a black state of the pixel (see the right part of FIG. 4), when the liquid crystal layer has been switched, the green, right-handed transmissive light from the backlight is not changed and will be absorbed by the top polariser. The green, red as well as blue, right-handed daylight (i.e. white right-handed daylight) will also not be changed by the liquid crystal layer 2, and it will all be transmitted through the cholesteric layer. However, this right-handed white light will be reflected by the reflective polarizer 7 and transmitted back to the viewer, somewhat reducing the black state. The light beam pattern of the transmissive part of the display in a reflective mode is disclosed in FIG. 3, in a "white" (left) and a "black" (right) state, respectively.

Figure 5:
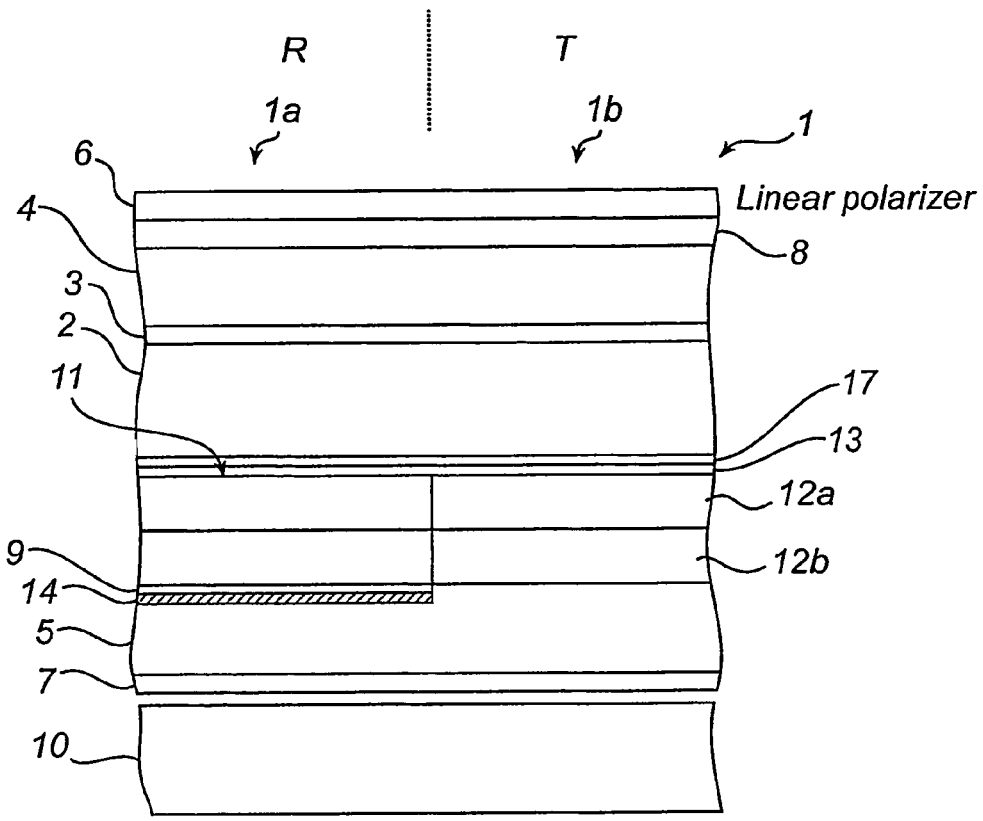
FIG. 5 illustrates a first alternative embodiment of the display device as shown in FIG. 1, further including an absorbing colour filter.
Figure 6:
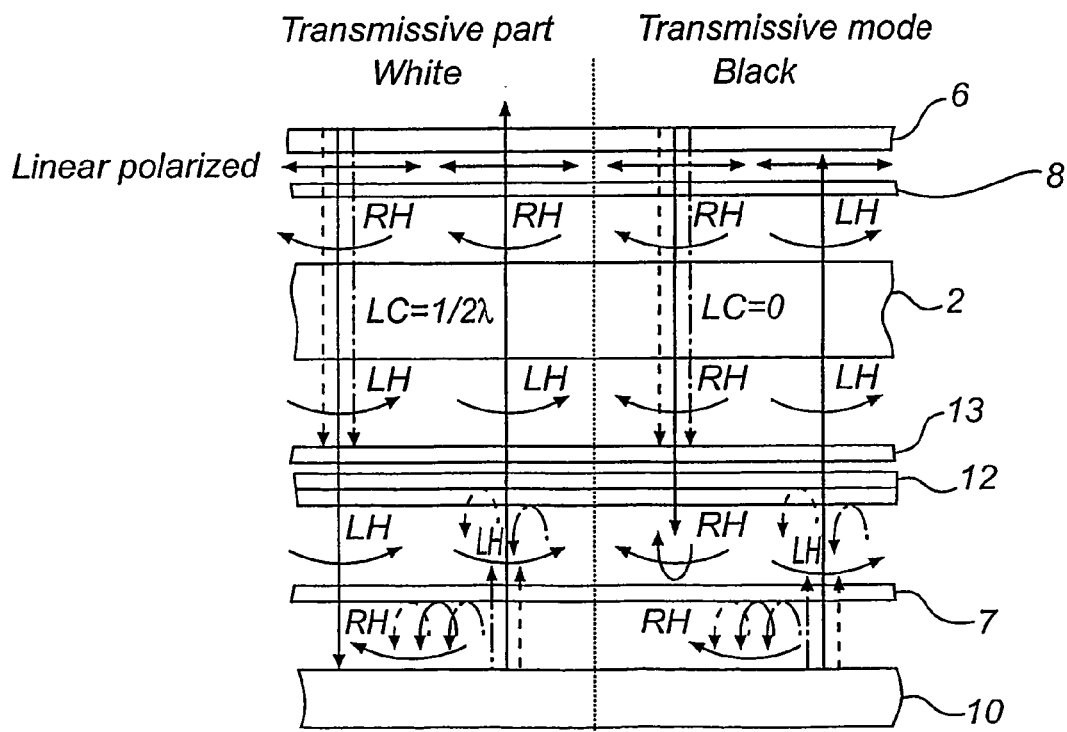
FIG. 6 illustrates the path of polarised light for a white and a black state of the transmissive part of the pixel shown in FIG. 5, in a transmissive mode.
Figure 7:
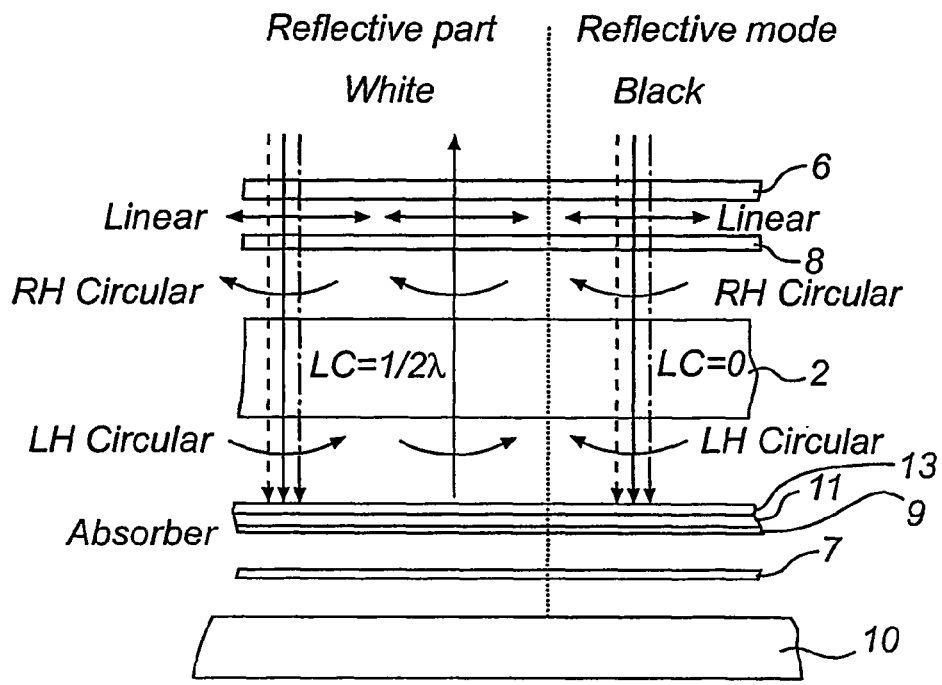
FIG. 7 illustrates the path of polarised light for a white and a black state of the reflective part of the pixel shown in FIG. 5, in a reflective mode.

A first alternative embodiment of this invention will hereinafter be described with reference to FIG. 5–7. This embodiment is essentially similar to the one disclosed in FIG. 1 and closely described above, but further includes an absorbing colour filter 13, in the present case being arranged between the liquid crystal layer 2 and the cholesteric layers 11, 12. The absorbing colour filter is arranged to absorb all colours but the desired primary colour of the pixel, in this case the colour green.

In the embodiment described above, with reference to FIG. 1, light falling into the display is changed into right-handed polarized light by the polariser 6 and the λ/4 plate 8. This in-falling light will be changed by the LC layer 2 into left-handed polarized light and the second cholesteric layer composition part 12 of the transmissive part 1b will hence reflect this light, while the green left-handed circular polarised light will be transmitted through the second cholesteric layer composition part 12 and the reflective polariser 7 and will be recycled in the backlight. The reflected red and blue left-handed circularly polarised light will be changed by the liquid crystal layer 2 into right-handed light, which will be transmitted through the λ/4 plate 8 and the linear polariser 6. In this way, the green transmissive light coming from the backlight will be mixed with red and blue reflected ambient light, which lowers the colour purity of the transmissive part of the pixel. This may be prevented by adding the above absorbing colour filter 13 to the stack, since this layer will absorb all red and blue ambient light, falling into the transmissive part of the display, and this light will hence not add to the colour of the pixel.

The inclusion of an absorbing colour filter prevents colour mixing by daylight in the transmissive mode. Hence, it improves the daylight contrast and prevents the decrease of colour purity by reflection of daylight on the red and blue layer of the cholesteric colour filter 12. It also prevents a colour shift of the display at large viewing angles. All light which is reflected at large angles is shifted to a shorter wavelength by the cholesteric colour filter of this invention. Hence, this light will be absorbed by the absorbing colour filter. Detailed light beam patterns for this embodiment is disclosed in FIG. 6 (transmissive part of display in transmissive mode) and FIG. 7 (reflective part or display in reflective mode).

Figure 8:
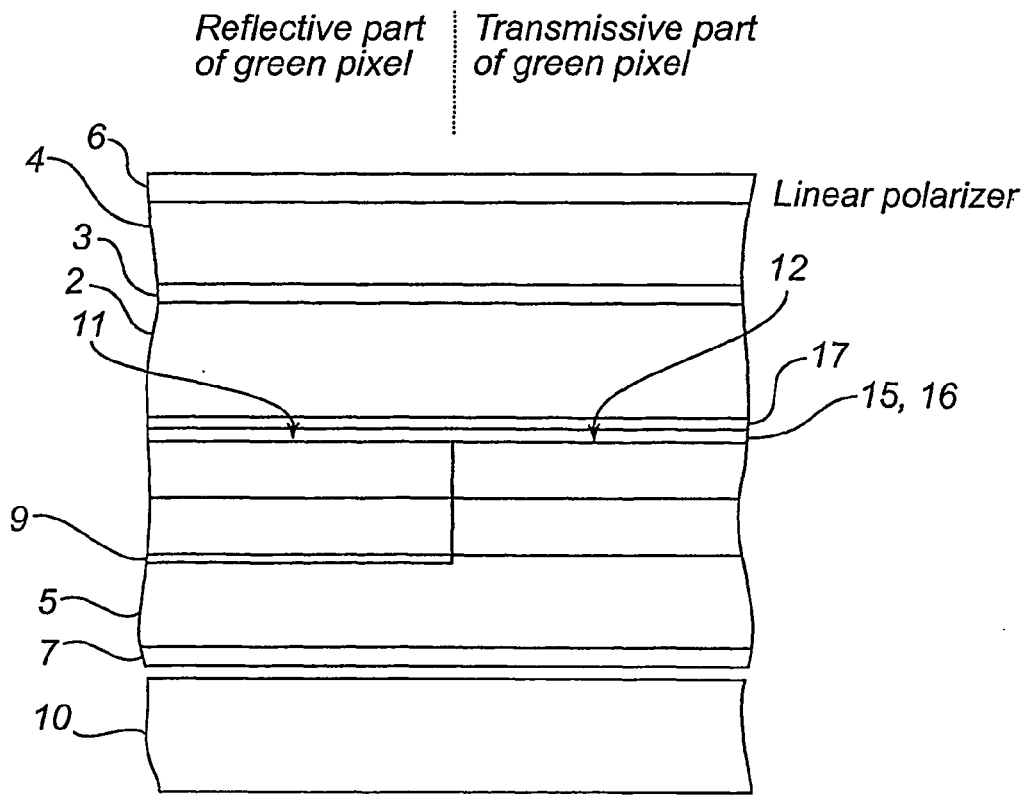
FIG. 8 illustrates a second alternative embodiment of the display device as shown in FIG. 1, further including an in-cell polariser and a quarterwave retarder.
Figure 9:
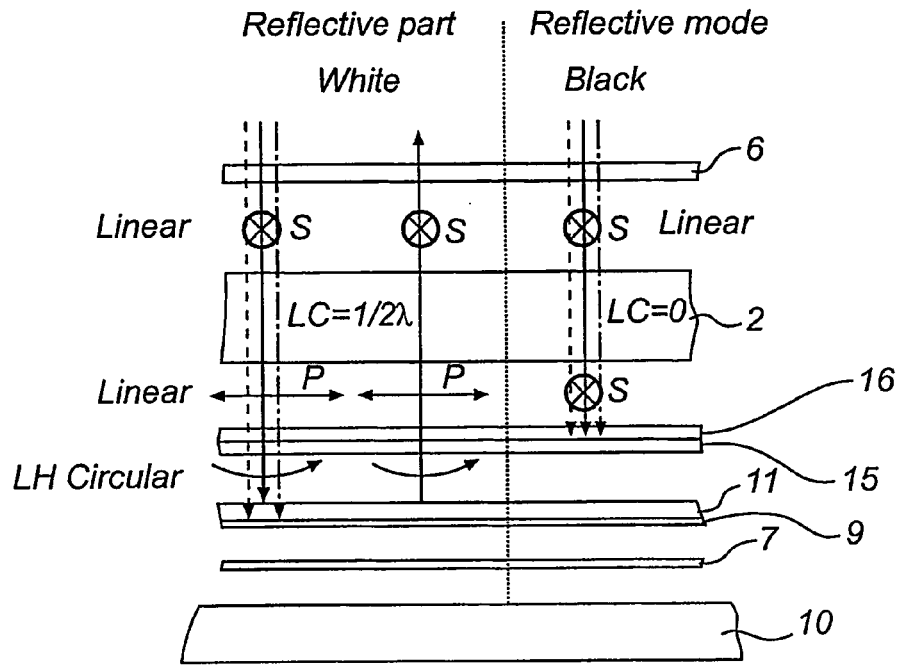
FIG. 9 illustrates the path of polarised light for a white and a black state of the reflective part of the pixel shown in FIG. 8, in a reflective mode.
Figure 10:
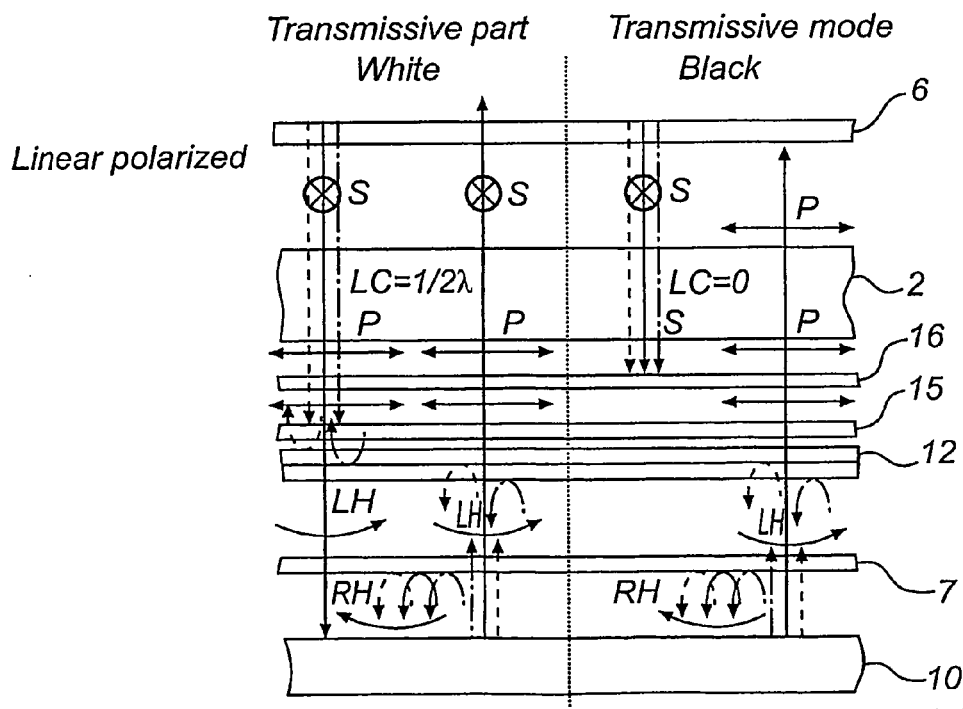
FIG. 10 illustrates the path of polarised light for a white and a black state of the transmissive part of the pixel shown in FIG. 8, in a transmissive mode.

A second alternative embodiment will hereinafter be described with reference to FIG. 8–10. This embodiment is essentially similar to, the one disclosed in FIG. 1 and closely described above, but further includes an in-cell λ/4 film 15 and an in-cell polariser 16 between the liquid crystal layer 2 and the cholesteric layer composition 11, 12, and further the λ/4 film 8 of the configuration shown in FIG. 1 is removed. By this embodiment, the reflection of white daylight in the black state of the transmissive part 1b of the pixel 1 may be deleted, as is disclosed in FIG. 10. In this embodiment, in the transmissive mode circularly polarised light is changed to linear polarized light by the λ/4 film 15 and is transmitted through the in-cell polariser 16. The top polariser 6 is rotated 90° with respect to the in-cell polariser 16, i.e. the polarisers 6, 16 are crossed. The liquid crystal layer 2, acting as a λ/2 plate, rotates the plane of polarisation by 90° and the light is transmitted through the top polariser. If the LC layer is switched, the plane of polarisation is not changed in the above manner and the light is hence absorbed by the top polariser (see FIG. 10). Furthermore, in the driven state, all linearly polarised daylight is absorbed by the in-cell polariser 16, as is shown in FIG. 9 and 10 for the reflective and transmissive part of the pixel, respectively. In the black state of the reflective part of the pixel (see FIG. 9), all linearly polarised light will be absorbed by the in-cell polariser.

Figure 11:
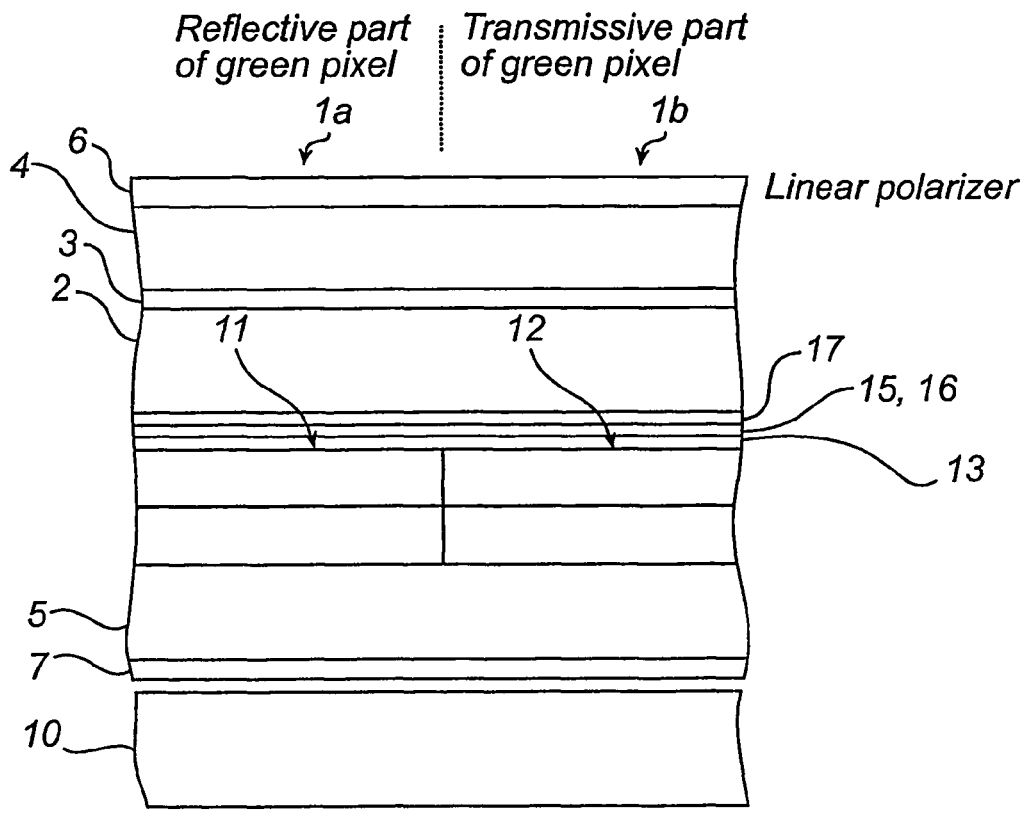
FIG. 11 illustrates a third alternative embodiment of the display device as shown in FIG. 1, including both an absorbing colour filter, an in-cell polariser and a quarter-wave retarder.
Figure 12:
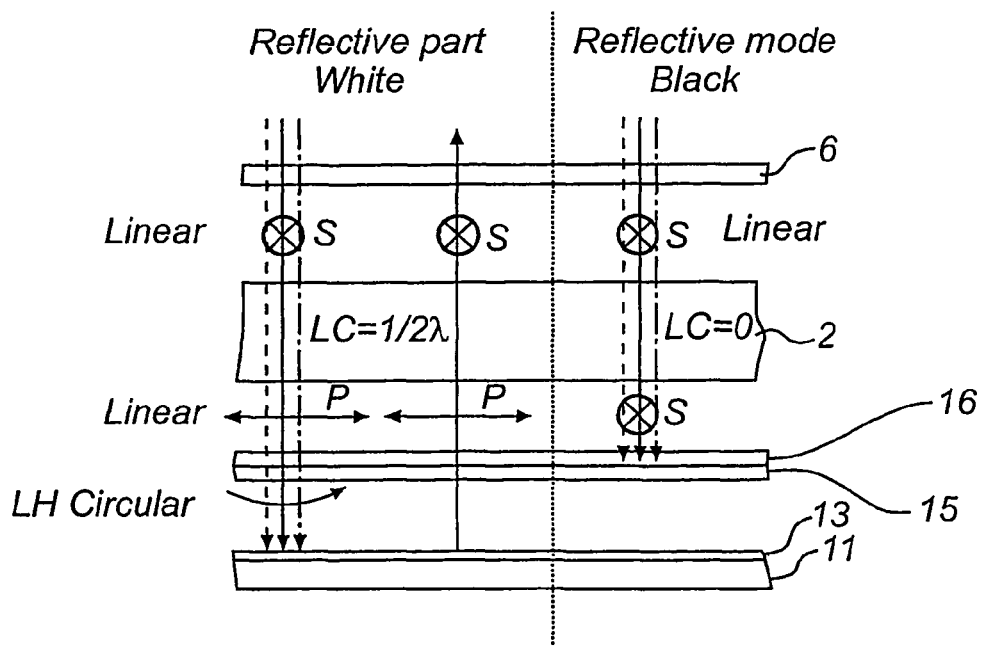
FIG. 12 illustrates the path of polarised light for a white and a black state of the reflective part of the pixel shown in FIG. 11, in a reflective mode.
Figure 13:
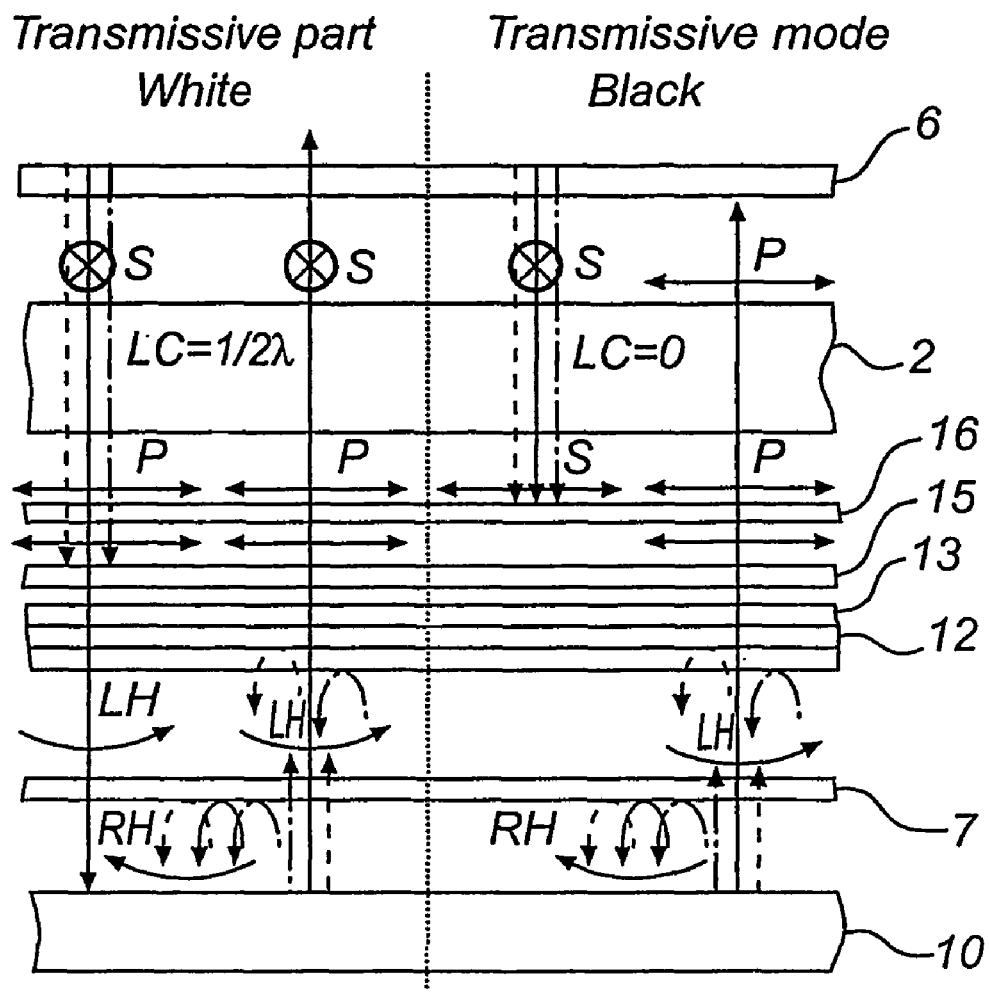
FIG. 13 illustrates the path of polarised light for a white and a black state of the transmissive part of the pixel shown in FIG. 11, in a transmissive mode.

A third alternative embodiment of this invention is to combine the first and second alternative embodiments, and hence add an absorbing colour filter, an in-cell λ/4 film 15 and an in-cell polariser 16 to the stack shown in FIG. 1, while removing the front λ/4 film 8, and suitably also the absorbing layer 9 (removed in FIG. 11), which by reasons stated above is not needed. This embodiment is disclosed in FIG. 11, with corresponding beam path patterns in FIG. 12 (reflective pixel part in reflective mode) and FIG. 13 (transmissive pixel part in transmissive mode). In this case all undesired reflections of ambient light is absorbed, either by the absorbing colour filter or the polariser.

It shall be noted that, although the above examples all disclose an active matrix transflective LCD, the invention is equally applicable in an passive matrix transflective LCD. In this case, the TFT layer 3, for example disclosed in FIG. 1, is replaced by an electrode layer, such as an ITO electrode, and if an absorbing colour filter is to be arranged in the pixel stack, it may be placed between the front substrate and the ITO layer. Moreover, a problem with prior art transflective LCD using cholesteric layers in some form is that they normally show a reverse image in the transmissive and reflective mode. However, this is not the case with the displays disclosed here. When the pixel is driven, the display is black in both the transmissive and reflective mode. In the non-driven state of the pixel, the display is "white" (in the case above, green) in the transmissive as well as in the reflective mode.

It shall also be noted that in the pixels disclosed here, for example in FIG. 1, the transmissive and reflective parts 1a, 1b of the pixel are of equal size. However, in a real display, the reflective part is usually larger than the transmissive part of the display. This results in that the mixing of blue and red light in a green ("white") state of the reflective mode, and addition of white light in the black state of the reflective and transmissive mode is somewhat reduced, due to a smaller reflection area.

Also, for illustrative purposes, the above description of the invention is aimed towards a display in which left-handed circularly polarised light is reflective. However, a man skilled in the art may easily adapt the above inventive structure to instead reflect right-handed, circularly polarised light.

Further, as stated above the display device has above been described with reference to a single pixel of the display device, in the present case a green pixel. However, the display device may however comprise a plurality of pixels, for example a plurality of green, red and blue pixels, in order to generate a fill colour display. The invention is equally applicable to pixels of any colour, and for a red and a blue pixel, for example, the colours of the cholesteric colour filter, and any colour filter are changed in such a way, in relation to the below description, that the pixel is red or blue, respectively, in the reflective mode as well as the transmissive mode, instead of green as in the present case. Hence, each pixel shall be designed to emit light of a primary colour, while suppressing light of the remaining primary colours. It shall also be noted the colours of the pixel may be chosen in any way that defines a full colour spectrum, and shall not be limited to red, green and blue.

It shall also be noted that, in this application, the term wavelength shall be construed as a wavelength or a wavelength interval. Furthermore, a "colour" as used in this application, shall be construed as covering a wavelength or a wavelength interval.

The invention claimed is:

1. A transflective liquid crystal display device, having a plurality of pixels, each comprising a liquid crystal layer being sandwiched between a front and a back substrate, a back light, a semi-transparent reflective element, being arranged between the back substrate and the back light, a front polariser, and a driving arrangement for controlling optical properties of the liquid crystal layer, whereby the pixel is subdivided into a reflective pixel part and a transmissive pixel part, characterized in that
   a cholesteric layer composition is arranged between said liquid crystal layer and the back substrate, said cholesteric layer composition comprising;
   in said reflective pixel part, a first cholesteric layer composition part for reflecting a desired primary pixel colour, and
   in said transmissive pixel part a second cholesteric layer composition part for reflecting the remaining primary colours, other than said desired primary pixel colour.

2. A transflective liquid crystal display device according to claim 1, wherein the second cholesteric layer composition part comprises a first and a second layer, wherein said first layer is arranged to reflect light of a first remaining primary colour and said second layer is arranged to reflect light of a second remaining primary colour.

3. A transflective liquid crystal display device according to claim 1, wherein the pixel further comprises an absorbing colour filter arranged between said liquid crystal layer and said cholesteric colour filter composition, said absorbing colour filter being arranged to absorb the remaining primary colours, transmitting only a desired primary pixel colour.

4. A transflective liquid crystal display device as in claim 1, wherein said pixel further comprises a in-cell quarterwave retarder plate and an in-cell polariser, both being arranged between the liquid crystal layer 2 and the cholesteric layer composition.

5. A transflective liquid crystal display device as in claim 1, wherein an absorbing layer is arranged in the reflective pixel part, between the first cholesteric layer composition part and the back substrate.

6. A transflective liquid crystal display device according to claim 5, wherein a mirror element is arranged between the absorbing layer and the back substrate.

7. A transflective liquid crystal display device as in claim 1, wherein said liquid crystal layer is arranged to act as a retarding λ/2 plate.

8. A transflective liquid crystal display device as in claim 1, wherein the semi-transparent reflective element is constituted by a reflective circular polariser.

9. A transflective liquid crystal display device as in claim 1, wherein said driving arrangement is one of an active matrix driving arrangement or a passive matrix driving arrangement.

10. A transflective liquid crystal display device as in claim 1, wherein said first and second cholesteric layer composition parts occupy essentially the same cell gap.

* * * * *